(No Model.)
W. R. WILCOX.
SWING.
No. 495,923. Patented Apr. 18, 1893.
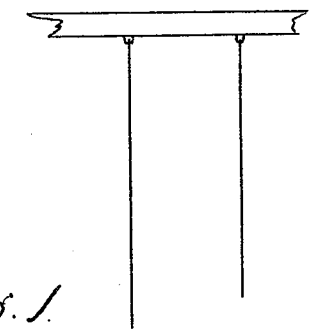
Fig. 1.
Fig. 3.
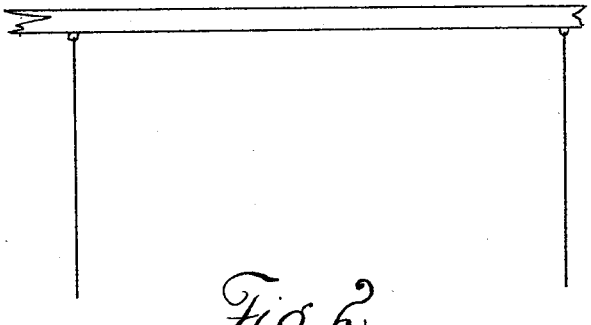
Fig. 2.
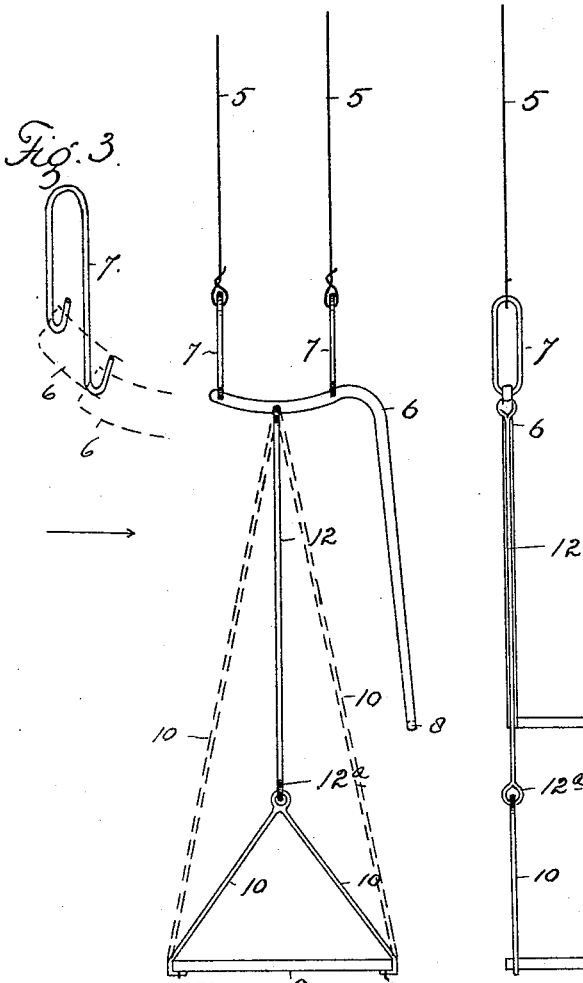
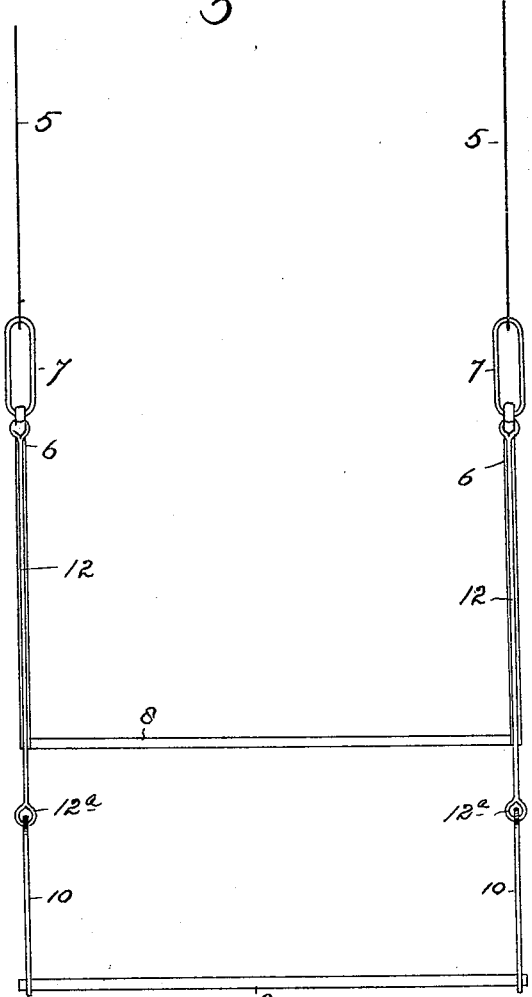
WITNESSES:
INVENTOR
William R. Wilcox
BY
A. J. O'Brien
ATTORNEY.

UNITED STATES PATENT OFFICE.

WILLIAM R. WILCOX, OF RIDGWAY, COLORADO.

SWING.

SPECIFICATION forming part of Letters Patent No. 495,923, dated April 18, 1893.

Application filed October 3, 1892. Serial No. 447,738. (No model.)

*To all whom it may concern:*

Be it known that I, WILLIAM R. WILCOX, a citizen of the United States of America, residing at Ridgway, in the county of Ouray and State of Colorado, have invented certain new and useful Improvements in Swings; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in swings and the object of the invention is to provide a device of the class stated which shall be simple in construction, easily operated, as well as durable and practicable in use.

To these ends the improvement consists of the features, arrangements and combinations hereinafter described and claimed and will be fully understood by reference to the accompanying drawings in which is illustrated an embodiment thereof.

In the drawings, Figure 1 is a side elevation of the invention, while Fig. 2 is a rear view thereof. Fig. 3 shows a modified form of link.

Similar reference characters indicating corresponding parts or elements of the mechanism in the several views let the numeral 5 designate the suspension ropes attached at their upper extremities to a suitable stationary support. I employ the word ropes in this specification in a broad and comprehensive sense, namely to designate suitable suspension means, whether ropes, cords, chains, rods or their equivalents. There are four of these ropes, two on each side connected with a lever 6 by means of links 7 which pass through apertures formed in the lever. These links are thus loosely or movably connected with the lever at one extremity, and with the suspension ropes at the opposite extremity, the latter attachment being made in any suitable manner. The two arms of the levers 6 are connected at their lower extremities by a rod 8.

The seat 9 is provided with an arm 10 at each side, each arm having at its upper extremity an eye in which the hook end 12ª of one of the depending bars 12 is seated, the upper extremities of these bars being hooked into central apertures formed in the lever between the apertures through which the links 7 pass. The extremities of bars 12 are movable at their respective points of attachment.

A person seated in the swing grasps the rod 8 and pulls thereon. This slackens or removes the weight from the rear suspension ropes and throws the same upon the forward ropes on each side. The seat then moves forward to bring the center of gravity in line with the forward ropes. When the seat has reached its forward limit of movement, the occupant of the swing pushes on handle 8. This action slackens the forward suspension ropes and throws the weight upon the rear ropes and the seat moves backward to bring the center of gravity in line with the rear ropes, one on each side. As the seat moves either forward or backward the movement causes it in each case to move somewhat farther than the line mentioned. Hence by the use of a series of successive and alternating pushes and pulls the seat is oscillated by a gradually and regularly accelerated motion until the arc of oscillation is as great as desired.

By the use of the modified form of link shown in Fig. 3 the depending arm of the lever may be thrown nearer or farther from the seat as may be desired. This construction consists of an open link provided with two arms of unequal lengths terminating in hooks. Only one hook of this style of link is employed at one time. If it is desired to throw the depending arm of the lever nearer the seat as when a child is using the swing, the short arm of the link is hooked into the rear aperture of the lever, while if it is desired to throw the lever farther from the seat, as when an adult person is swinging, the longer arm of the link is hooked into this aperture.

If desired the depending arms 12 may be dispensed with and arms 10 of the seat connected directly with the lever as indicated by dotted lines in Fig. 1.

Having thus described my invention, what I claim is—

1. In a swing the combination with a seat, the levers, side arms connecting the seat with the levers, suspension ropes connected with the levers, at points in the front and rear of the seat suspension arms a support above to which the ropes are attached and a rod or hand piece connecting the levers substantially as described.

2. In a swing the combination with the seat, the downwardly extending levers, side arms connecting the levers with the seat, a support above and suitable suspension means for connecting the levers with said support, said means being attached to the levers at points in the front and rear of the seat suspension arms substantially as described.

In testimony whereof I affix my signature in presence of two witnesses.

WILLIAM R. WILCOX.

Witnesses:
　WM. MCCONNELL,
　W. H. MCCARTHY.